(12) United States Patent
Wolfe

(10) Patent No.: US 6,443,421 B1
(45) Date of Patent: Sep. 3, 2002

(54) POPPET VALVE WITH SLEEVE

(76) Inventor: David Lowell Wolfe, 5043 Patricia Dr., Akron, OH (US) 44319

( * ) Notice: Subject to any disclaimer, the term of this patent is extended or adjusted under 35 U.S.C. 154(b) by 0 days.

(21) Appl. No.: 09/629,666

(22) Filed: Aug. 1, 2000

Related U.S. Application Data

(60) Provisional application No. 60/146,868, filed on Aug. 3, 1999.

(51) Int. Cl.[7] ................................................ F16K 1/50
(52) U.S. Cl. ............................ 251/62; 251/323; 384/28; 425/437
(58) Field of Search ............................ 425/405.1, 437; D8/354; 384/28, 37, 38, 32, 7; 251/62, 63, 63.5, 63.6, 321, 322, 323, 337; 137/535, 538, 542, 543, 543.13

(56) References Cited

U.S. PATENT DOCUMENTS

| | | | | |
|---|---|---|---|---|
| 1,250,503 A | * | 12/1917 | Ray | 137/540 X |
| 1,434,473 A | * | 11/1922 | Arnold | 251/322 |
| D128,264 S | * | 7/1941 | Rodriguez | D8/354 |
| 2,773,284 A | | 12/1956 | Kelly | 18/30 |
| 2,858,838 A | * | 11/1958 | Scaramucci | 137/543.13 X |
| 2,875,472 A | | 3/1959 | Marcus | 18/42 |
| 3,111,961 A | * | 11/1963 | Dudgeon | 137/541 X |
| 3,183,551 A | * | 5/1965 | Johnson | 425/437 |
| 3,727,636 A | * | 4/1973 | Simmons | 137/542 X |
| 3,892,512 A | | 7/1975 | Diehl | 425/251 |
| 4,025,268 A | | 5/1977 | Taylor | 425/246 |
| 4,124,336 A | | 11/1978 | Johnson | 425/4 |
| 4,171,941 A | | 10/1979 | Yotsutsuji et al. | 425/146 |
| D272,718 S | * | 2/1984 | Knudson | D8/387 |
| 4,521,367 A | | 6/1985 | Underwood | 264/318 |
| 4,532,958 A | * | 8/1985 | Napolitano | 137/454.2 |
| 4,614,661 A | * | 9/1986 | White et al. | 137/543 X |
| 4,682,625 A | * | 7/1987 | Christopher | 137/538 |
| 4,862,913 A | * | 9/1989 | Wildfang | 137/543 |
| 4,890,937 A | * | 1/1990 | Balsells | 384/37 X |

* cited by examiner

Primary Examiner—Lesley D. Morris
Assistant Examiner—Eric Keasel
(74) Attorney, Agent, or Firm—Frederick K. Lacher

(57) ABSTRACT

A poppet valve assembly having a spring for holding the valve in a closed position and permitting opening of the valve in response to air pressure including valve stem alignment provided by a sleeve in engagement with the spring and having a cross pin supporting surface for engagement with the pin in shear to avoid bending.

2 Claims, 3 Drawing Sheets

POPPET VALVE WITH SLEEVE

This Utility Patent Application claims priority from Provisional Patent Application Serial No. 60/146,868 filed Aug. 3, 1999.

FIELD OF INVENTION

This invention relates to poppet valves and more specifically to poppet valves utilized for communicating air pressure into a mold to eject the molded articles after molding.

DESCRIPTION OF THE RELATED ART

A poppet valve such as that shown in the prior art drawing FIG. 1 has been utilized in the ejecting of molded articles by communicating air pressure to the valve as the mold opens. Difficulties have been encountered, such as axial angular displacement when the valve opens because of the lack of guidance for the poppet valve stem. Also, the cross pin which limits the movement of the poppet valve out of the valve seat is subjected by the spring to a cantilevered load which may bend the pin.

BRIEF SUMMARY OF THE INVENTION

The present invention is directed to a poppet valve construction which prevents axial angular displacement as the valve opens and controls the axial linear displacement. The cross pin is also positioned to eliminate the cantilevered load on the pin by the spring.

In accordance with one aspect of the invention there is provided a poppet valve assembly comprising a valve body member having a valve seat, a poppet valve member for seating in the valve seat, orifices in the valve seat in communication with a source of air pressure, the poppet valve member having a valve stem extending through a cylindrical opening in the valve body member characterized by a cylindrical sleeve member having an outer diameter substantially the same as the diameter of the cylindrical opening in the valve body member with a length of reduced diameter providing a shoulder for engaging a spring and an inner diameter substantially the same as the diameter of the valve stem, the valve body having slots for receiving a cross pin extending through the valve stem and the sleeve member, and a coil spring interposed between the sleeve and the body member with the spring engageable with the shoulder for closing the poppet valve whereby the sleeve guides the valve stem and prevents axial angular displacement of the valve stem and the sleeve through its sliding fit over the valve stem provides a shear plane for forces applied to the cross pin.

DETAILED DESCRIPTION OF THE INVENTION

Figure 1:
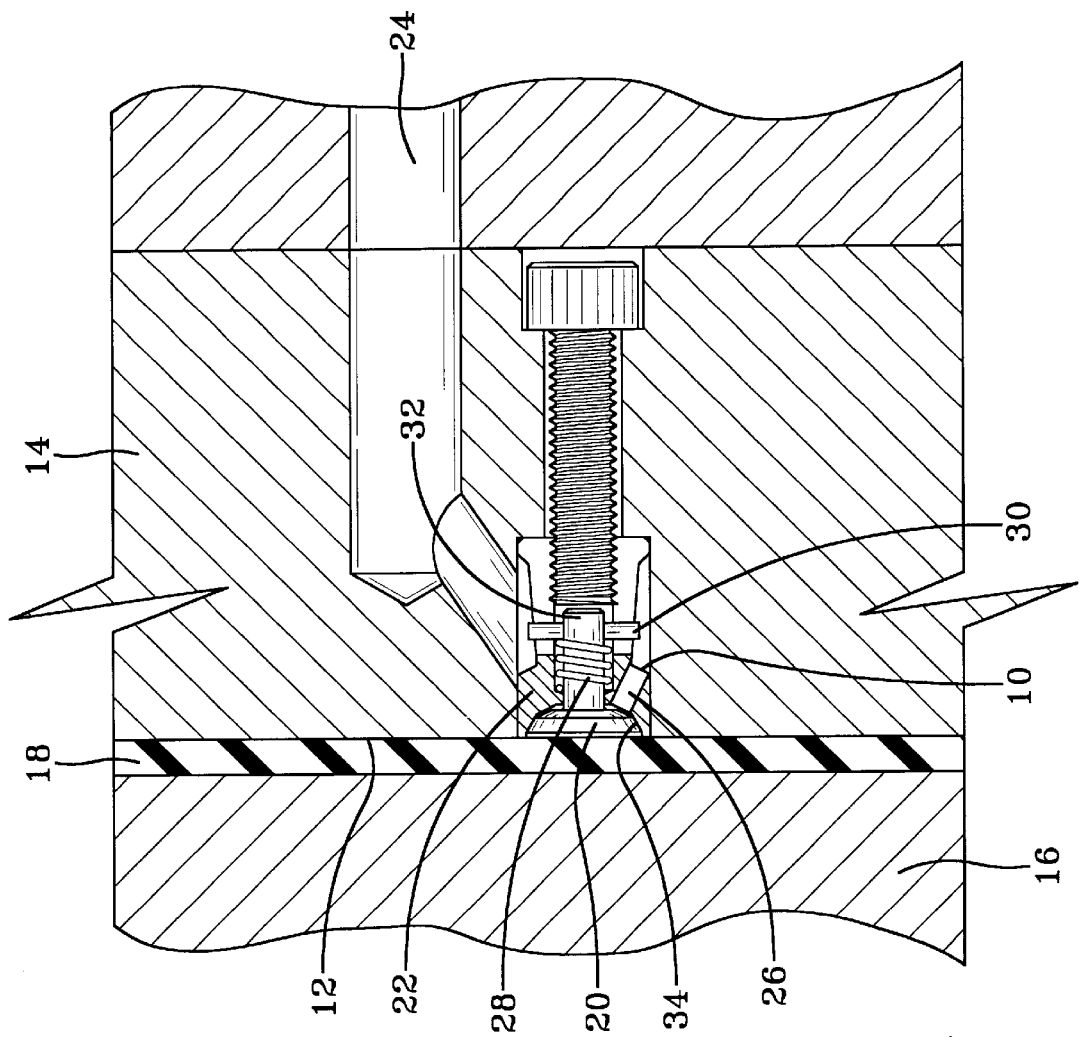
FIG. 1 is a fragmentary sectional view of a mold illustrating the prior art and showing poppet valve of a type used heretofore.

Referring to FIG. 1, a fragmentary sectional view of a poppet valve assembly 10 of the type used in the prior art is shown mounted in a mold face 12 of a first mold half 14 spaced from a second mold half 16 between which a molded object 18 is contained upon injection from a suitable source (not shown). After injection of the mold material forming the molded object 18, the second mold half 16 is moved away from the first mold half 14. At this time compressed air is supplied to the poppet valve assembly 10 opening the valve and communicating compressed air to the molded object 18 which separates it from the first mold 14. The molded object 18 is carried away from the first mold half 14 to a position where it can be removed from the second mold half 16. In accordance with the prior art poppet valve assembly 10 has poppet valve member 20 which is moved away from a valve seat 22 by compressed air communicated to the valve seat 22 through a passage 24 in the first mold half 14 and air vents 26 in the valve seat. The compressed air moves the poppet valve member 20 away from the valve seat 22 and compresses a coiled spring 28 which is disposed between a flange on the valve body member 22 and a cross pin 30 extending through a valve stem 32 of the poppet valve member 20. After the flow of compressed air between the poppet valve member 20 and a valve seat 34, has been discontinued the spring 28 will return the poppet valve member 20 to the seated position. Although this prior art poppet valve assembly 10 has operated satisfactorily in many applications, it has been found that in some cases the bottom of the valve stem 32 is not guided which causes wear on the sealing surface of the poppet valve member 20. This has caused the poppet valve assembly 10 to fail. Also the poppet valve member 20 may not seat in the valve seat 34 after being used because the valve stem 32 is not guided for a concentric return by the spring 28. This is not desirable because the poppet valve member 20 needs to be flush with the mold surface 12 so as not to cause irregularities or flaws in the molded object 18.

Problems have also been had with the cross pin 30 in that the spring 28 bears directly on the pin and exerts a cantilevered force which has caused the pin and spring to wear resulting in a malfunction of the poppet valve assembly 10 of the prior art.

Figure 2:
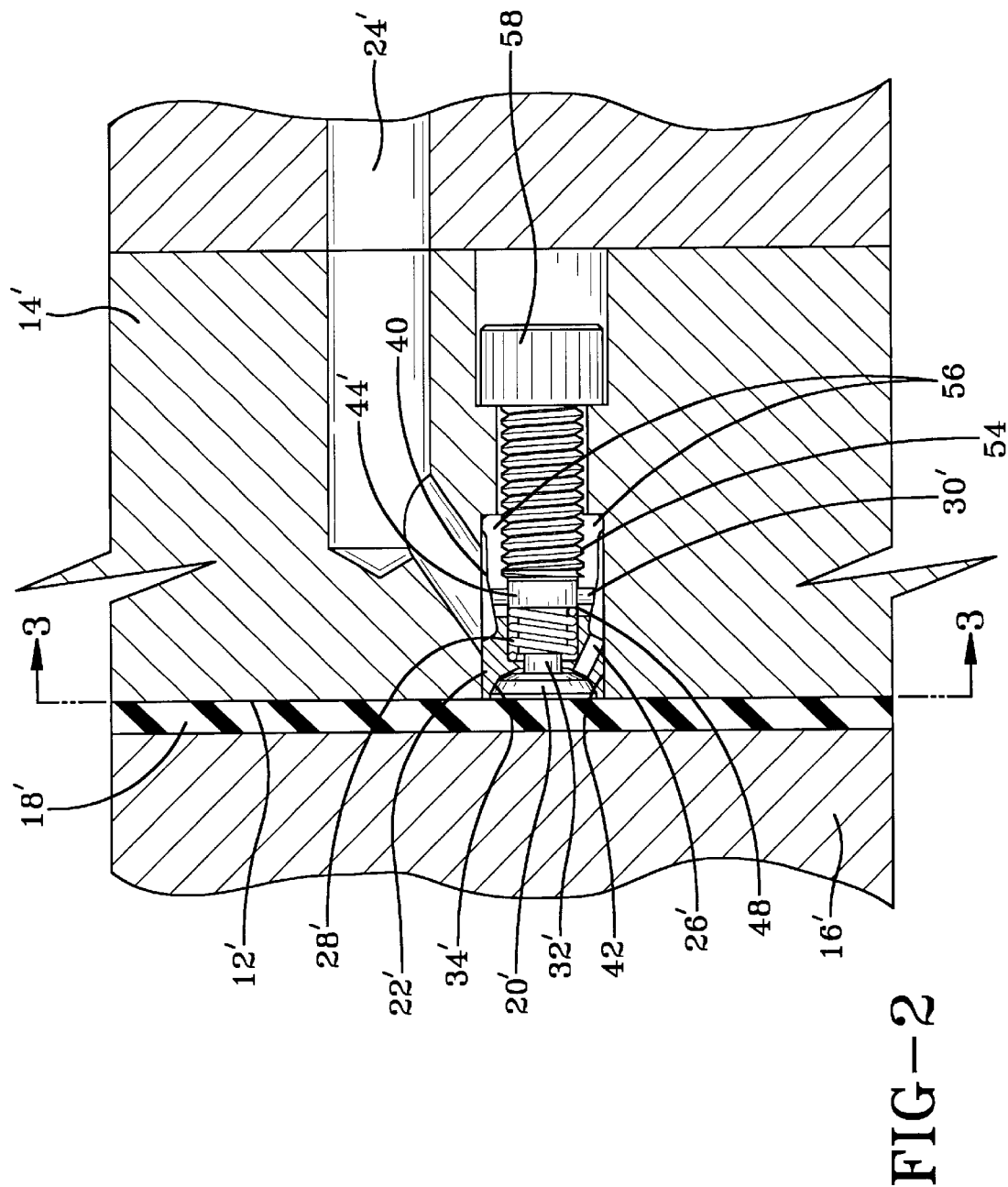
FIG. 2 is a sectional view like FIG. 1 showing a poppet valve embodying the present invention.
Figure 4:
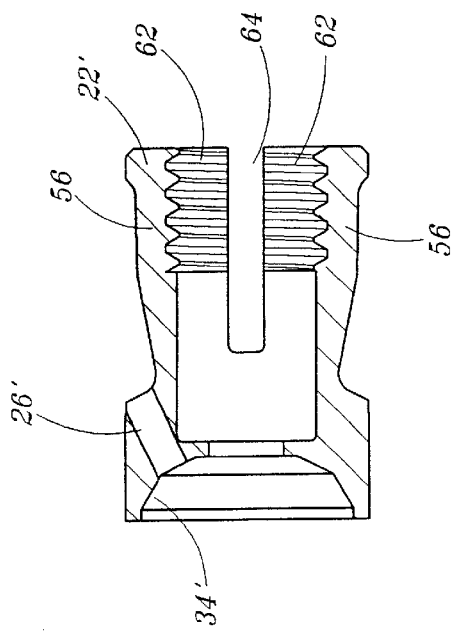
FIG. 4 is a sectional view of the valve body shown in FIG. 3 taken along the plane of line 4—4 in FIG. 3.
Figure 6:
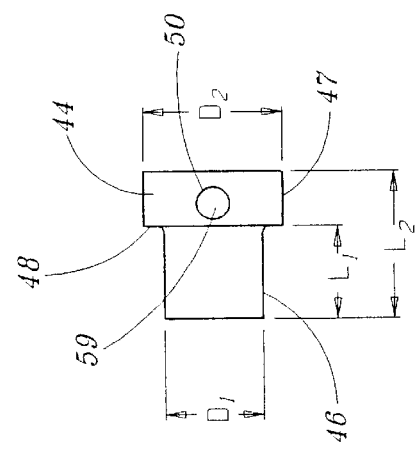
FIG. 6 is a plan view of the sleeve as shown in FIG. 2.

With reference to FIG. 2, a poppet valve assembly 40 embodying the invention is shown mounted in the same position as the prior art poppet valve assembly 10 in FIG. 1. Where the parts shown in FIG. 2, are the same as the parts shown in FIG. 1 they are designated by the same numerals as in FIG. 1, but with an prime symbol. The poppet valve assembly 40 is mounted in the mold face 12' of a first mold half 14' spaced from a second mold half 16' providing a space for a molded object 18'. The poppet valve assembly 40 is mounted in a cylindrical recess 42 in the mold face 12' and includes a valve body member 22' as shown in FIGS. 2 and 4. The valve body member 22' has a valve seat 34' for receiving a poppet valve member 20' having a valve stem 32' extending through a sleeve member 44 as shown in FIG. 6. The sleeve member 44 has a spring supporting surface 46 of a diameter D-1 and a pin supporting surface 47 of a diameter D-2 which is greater than the diameter D-1 of the spring supporting surface providing a shoulder 48 against which the spring 28' abuts. A cross pin 30' extends through an opening 50 in the sleeve member 44 and through an opening 52 in the valve stem 32'. Compressed air is supplied through air passage 24' and air vents 26' in the valve seat 34'. The valve body member 22' may have threads 54 in flange 56 for receiving threads of a bolt 58 extending through the first mold half 14' and engaging the valve body threads 54.

Figure 5:
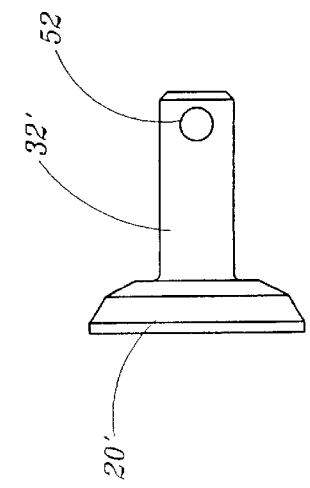
FIG. 5 is a plan view of the poppet valve member with the valve stem as shown in FIG. 2.

As shown in FIG. 5, the valve stem hole 52 is drilled through the stem receiving the cross pin 30' which also extends through a hole 59 in the sleeve member 44.

Figure 3:
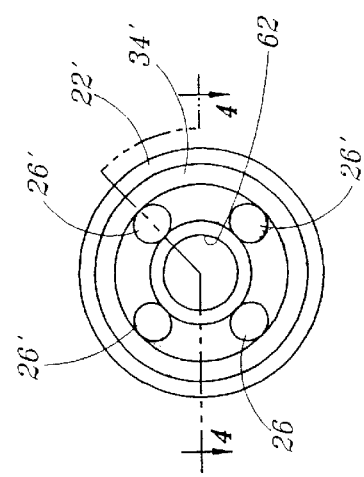
FIG. 3 is an end view of the poppet valve body with the poppet valve removed taken along the plane of line 3—3 in FIG. 2.

As shown in FIG. 3, the valve body member 22' may have four air vents 26' positioned radially inward of the outer diameter of the poppet valve seat 34'. A bearing surface may be provided in a cylindrical opening 62 of the valve body member 22' for receiving the valve stem 32'.

Preferably the material for the sleeve member 44 is 420 stainless steel. With reference to FIG. 6, the sleeve member of this embodiment has the following dimensions: a diameter D-1 of 0.099 inches (0.25 cm) and a diameter D-2 of 0.141 inches (0.35 cm). The length L-1 of the spring supporting surface 46 is 0.085 inches (0.21 cm) and the total length of the sleeve member 44 is 0.155 inches (0.39 cm). The diameter of the hole 49 for the pin 50 is 0.039 inches (0.09 cm).

Referring to FIG. 4, the valve body member 22' has a cylindrical opening 62 for receiving the sleeve member 44 and the spring 28'. This opening 62 has a diameter of 0.145 inches (0.36 cm). Opposing slots 64 in the flange 56 provide access to the air passage 24 and permit movement of the cross pin 30'.

In operation the poppet valve assembly 40 is held in the closed position shown in FIG. 2 by the spring 28' engaging the shoulder 48 of the sleeve member 44. Movement of the sleeve member 44 on the valve stem 32' is prevented by cross pin 30' extending through the hole 52 in the valve stem 32' and the hole 50 in the sleeve member. The molded object 18' is formed between the first mold half 14' and second mold half 16' by injection or other means well known to those skilled in the art. The second mold half 16' is then moved away from the first mold half 14' and compressed air communicated through the air passage 24' and the air vents 26' to the poppet valve member 20' urging the poppet valve member against the molded object 18' and separating the object from the mold face 12' by injecting air between the object and the mold face. The spring 28' is compressed between the shoulder 48 and the valve body member 22' by the valve stem 32' urging the cross pin 30' towards the poppet valve member 20'. During this operation the valve stem 32' is maintained in a coaxial relationship by the sleeve member 44 so that after ejecting the molded object 18' the poppet valve member 20' will be seated coaxially in the valve seat 34'. Also with this construction the forces resulting from compression of the spring 28' are transferred to the cross pin 30' in shear by the sleeve member 44 and damage to the pin by bending is avoided.

While a certain representative embodiment and details have been shown for the purpose of illustrating the invention, it will be apparent to those skilled in the art that various changes and modifications may be made therein with out departing from the spirit or scope of the invention.

What is claimed is:

1. A poppet valve assembly for mounting in a mold comprising a valve body member having a valve seat, a poppet valve member having a valve stem and a coil spring for seating said poppet valve member in said valve seat, a cross pin extending through said stem at a position spaced from said valve seat characterized by a movable sleeve member mounted over said stem and inside of said coil spring for movement with said poppet valve member, a radially outward flange on said sleeve member positioned over said cross pin and providing a seat for one end of said coil spring opposite to said valve seat end of said valve body member, said sleeve member having an outer diameter substantially the same as an inner diameter of said valve body member for sliding engagement with said poppet valve upon opening and closing of said poppet valve assembly whereby said sleeve member guides said valve stem preventing axial angular displacement of said valve stem by said cross pin extending outwardly from said sleeve member through said radially outward flange into slots in said valve body member to guide and limit movement of said poppet valve member.

2. A poppet valve assembly comprising a valve body member having a valve seat, a poppet valve member for seating in said valve seat, orifices in said valve seat in communication with a source of air pressure, said poppet valve member having a valve stem extending through a cylindrical opening in said valve body member characterized by a cylindrical sleeve member having an outer diameter substantially the same as the diameter of said cylindrical opening in said valve body member with a length of reduced diameter providing a shoulder for engaging a spring and an inner diameter substantially the same as said diameter of said valve stem, said valve body member having openings for receiving a cross pin extending through said valve stem and said sleeve member, and a coil spring interposed between said sleeve member and said body member with said spring engageable with said shoulder for closing said poppet valve whereby said sleeve member guides said valve stem and prevents axial angular displacement of said valve stem and said sleeve member through its sliding fit over said valve stem provides a shear plane for forces applied to said cross pin.

* * * * *